United States Patent
Kuwahara et al.

(10) Patent No.: US 7,338,997 B2
(45) Date of Patent: Mar. 4, 2008

(54) POLYMER FOR CARBON FIBER PRECURSOR

(75) Inventors: Hiroaki Kuwahara, Yamaguchi (JP); Hirotaka Suzuki, Yamaguchi (JP); Shunichi Matsumura, Yamaguchi (JP)

(73) Assignee: Teijin Limited, Osaka (JP)

( * ) Notice: Subject to any disclaimer, the term of this patent is extended or adjusted under 35 U.S.C. 154(b) by 216 days.

(21) Appl. No.: 10/542,805

(22) PCT Filed: Jan. 20, 2004

(86) PCT No.: PCT/JP2004/000391

§ 371 (c)(1),
(2), (4) Date: Jul. 20, 2005

(87) PCT Pub. No.: WO2004/065434

PCT Pub. Date: Aug. 5, 2004

(65) Prior Publication Data

US 2006/0183834 A1    Aug. 17, 2006

(30) Foreign Application Priority Data

Jan. 23, 2003 (JP) .............................. 2003-014604
Dec. 24, 2003 (JP) .............................. 2003-426454

(51) Int. Cl.
*C08K 3/00* (2006.01)
*C08F 118/02* (2006.01)
*C08F 20/44* (2006.01)

(52) U.S. Cl. .................. 524/401; 526/319; 526/341
(58) Field of Classification Search ................ 524/401; 526/319, 341
See application file for complete search history.

(56) References Cited

U.S. PATENT DOCUMENTS

| 3,519,674 A | * | 7/1970 | Arad et al. ................ 558/362 |
| 3,679,562 A | | 7/1972 | Tabata et al. |
| 4,107,408 A | | 8/1978 | McLoughlin et al. |
| 5,135,997 A | | 8/1992 | Feltgen et al. |

FOREIGN PATENT DOCUMENTS

| EP | 0397394 A2 | * | 11/1990 |
| GB | 933595 A | * | 1/1965 |
| JP | 48-63029 A | | 9/1973 |
| JP | 49-14404 B | | 4/1974 |
| JP | 52-53995 A | | 4/1977 |
| JP | 52-55725 A | | 5/1977 |
| JP | 58-48643 B2 | | 10/1983 |
| JP | 61-152812 A | | 7/1986 |
| JP | 62-282016 A | | 12/1987 |
| JP | 2-14013 A | | 1/1990 |
| JP | 3-68608 A | | 3/1991 |
| JP | 03068608 A | * | 3/1991 |
| JP | 3-76823 A | | 4/1991 |
| JP | 03076823 A | * | 4/1991 |
| JP | 6-27368 B2 | | 4/1994 |
| JP | 7-109358 A | | 4/1995 |
| JP | 7-216024 A | | 8/1995 |
| JP | 9-21019 A | | 1/1997 |
| JP | 11-117123 A | | 4/1999 |

OTHER PUBLICATIONS

W. Watt et al., The pyrolysis of polyacrylonitrile, Proceedings of the International Conference on Carbon Fibers, London, No. 4, 1971, pp. 23-31.
N.A. Kobasova et al.; Vysokomolekulyarnye Soedineniya; Seriya A, Russia 13 (1), 1971, pp. 162-167, w/English Abstract.
MA. Geiderikh et al.; Vysokomolekulyarnye Soedineniya, Seriya A. Russia 15(6); 1973, pp. 1239-1247, w/English Abstract.

* cited by examiner

*Primary Examiner*—David W. Wu
*Assistant Examiner*—Karuna Reddy
(74) *Attorney, Agent, or Firm*—Sughrue Mion, PLLC

(57) ABSTRACT

There is provided a carbon fiber precursor polymer which is composed of a polymer comprising 50 wt % or greater of an acrylonitrile component, wherein the isotactic triad proportion of the acrylonitrile structural chain composed of the acrylonitrile component is 35 mole percent or greater based on the total triad proportion of the acrylonitrile structural chain composed of the acrylonitrile component, the carbon fiber precursor polymer allowing flame retardant treatment to be carried out slowly from a low temperature range, and having satisfactory flame retardant properties including low heat generation.

1 Claim, No Drawings

POLYMER FOR CARBON FIBER PRECURSOR

TECHNICAL FIELD

The present invention relates to a carbon fiber precursor polymer which allows production of carbon fibers, to a carbon fiber precursor obtained by spinning the polymer, and to a flame retardant carbon fiber precursor obtained by heat treatment thereof. More specifically, the invention relates to a carbon fiber precursor polymer and carbon fiber precursor which yield high quality, high performance carbon fibers wherein the temperature for flame retardant treatment can be lowered by controlling the stereoregularity of the acrylonitrile repeating unit of the polyacrylonitrile, in order to reduce the energy and time required for flame retardant treatment, and wherein no fusion or thermal decomposition occurs between fibers even as carbonization proceeds.

BACKGROUND ART

Carbon fibers generally have excellent mechanical properties and especially high specific strength and specific modulus, and are therefore widely used as strength modifiers for various reinforcing materials in aerospace applications, leisure goods, industrial materials and the like. Because of their superior mechanical properties, they have potential application for reducing automobile weight and are receiving increasing attention as an important advance in solving the urgent problem of reducing carbon dioxide.

Such carbon fibers are produced by subjecting precursor organic polymer fibers to flame retardant treatment, firing and carbonization in the presence of oxygen. Various precursors may be mentioned, including cellulose, phenol resins, polyvinyl alcohol, vinylidene chloride, pitch, polyacrylonitrile (hereinafter abbreviated as "PAN") and the like. Carbon fibers derived from PAN-based fibers are particularly superior in their dynamic properties such as specific strength and specific modulus, and because they can be produced with uniform and stable quality and performance, they are mass produced on an industrial scale.

When PAN-based fibers are subjected to flame retardant treatment followed by carbonization to produce carbon fibers, it has normally been necessary to carry out heat treatment for a long period in a high-temperature oxidizing atmosphere of 200-400° C., as the conditions for flame retardant treatment. This is because flame retardant treatment of the precursor PAN-based fibers attempted all at once in a short period at a temperature of 500° C. or above produces a sudden exothermic decomposition reaction which results in self combustion and decomposition of the polymer, preventing formation of the desired carbon skeleton. Furthermore, prolonged high-temperature heat treatment is not only problematic in economic terms because of high energy consumption and low productivity, but also in terms of quality from the standpoint of strength reduction due to fusion between single fibers, and in terms of process flow since filament breakage readily occurs at high temperature, for which reasons a need exists for industrial improvement.

Various proposals have been set forth in the prior art in order to avoid such problems. For example, there has been proposed the use of a PAN-based precursor obtained by copolymerization of a specific amount of a polymerizable unsaturated carboxylic acid ammonium salt (for example, see patent documents 1 and 2) and the use of a precursor which is PAN obtained by copolymerization of a long-chain alkyl ester of a polymerizable unsaturated carboxylic acid (for example, see patent document 3).

These precursors exhibit certain effects of promoting flame retardant reaction, but the low copolymerizability of unsaturated carboxylic acids often leads to blocking of the copolymer. In addition, a high proportion of a carboxylic acid component with poor heat resistance is a disadvantage in that it can lead to lower yields as a result of thermal decomposition during the flame retardant step following the polymerization step.

On the other hand, it has been demonstrated that copolymerization of α-chloroacrylonitrile with acrylonitrile can drastically shorten the flame retardant time and solve the problem of poor productivity (for example, see patent documents 4 and 5). Still, a large amount of the costly α-chloroacrylonitrile component must be used for copolymerization in order to adequately shorten the flame retardant time, thus presenting an economic drawback which counteracts with the improvement in productivity.

It has also been disclosed that using a terpolymer incorporating itaconic acid and an acrylamide-based monomer with acrylonitrile can improve the flame retardant properties (for example, see patent document 6), but in addition to the difficulty of obtaining a homogeneous copolymer with three different monomers, any excess of itaconic acid can result in a violent exothermic reaction producing damage in the fiber structure, while an excess of the acrylamide monomer can produce fiber fusion and can thereby complicate control of the copolymer composition and influence productivity. Other proposals include using hydroxymethylene (for example, see patent document 7), halogenated alkyl esters of unsaturated carboxylic acids (for example, see patent document 8) and silicon- or fluorine-containing unsaturated monomers (for example, see patent document 9) as copolymerization components, but none of these have exhibited satisfactory effects from a cost and performance standpoint.

On the other hand, research is also progressing in the area of flame retardant reaction for PAN-based fibers. For example, flame retardant reaction for PAN-based fibers is now known to be initiated by oxidation and cyclization of adjacent nitrile skeletons (for example, see non-patent document 1).

In addition, it has been reported through past research that for such thermally induced reactions, the polymer microstructure, and specifically the stereoregularity of the polymer main chain described by its tacticity, can affect the reaction temperature and reaction rate. For example, it has been demonstrated that formation of an imine skeleton from nitrile groups by heating proceeds preferentially at low temperature with isotactic chains rather than with atactic or syndiotactic chains (for example, see non-patent documents 2 and 3).

Copolymers of PAN with no stereostructure regularity, i.e. atactic PAN, obtained by ordinary radical polymerization have been used as conventional carbon fiber precursor polymers and carbon fiber precursors. Still, no literature or reports have been published to date which examine the use of a single PAN with stereostructure regularity, i.e. isotactic PAN, as a carbon fiber precursor polymer and carbon fiber precursor with excellent flame retardant reactivity.

[Patent Document 1]

Japanese Unexamined Patent Publication SHO No. 48-63029

[Patent Document 2]

Japanese Examined Patent Publication SHO No. 58-48643

[Patent Document 3]
Japanese Unexamined Patent Publication SHO No. 61-152812
[Patent Document 4]
Japanese Examined Patent Publication SHO No. 49-14404
[Patent Document 5]
Japanese Examined Patent Publication HEI No. 6-27368
[Patent Document 6]
Japanese Unexamined Patent Publication HEI No. 11-117123
[Patent Document 7]
Japanese Unexamined Patent Publication SHO No. 52-53995
[Patent Document 8]
Japanese Unexamined Patent Publication SHO No. 52-55725
[Patent Document 9]
Japanese Unexamined Patent Publication HEI No. 2-14013
[Non-patent Document 1]
W. Watt et al., "Proceedings of the International Carbon Fiber Conference London", Paper No. 4, 1971
[Non-patent Document 2]
N. A. Kobasova et al., "VYSOKOMOLEKULYAR NYE SOEDINENIYA SERIYA A", Russia, 13(1), 1971, P. 162-167
[Non-patent Document 3]
M. A. Geiderikh, "VYSOKOMOLEKULYAR NYE SOEDINENIYA SERIYA A", Russia, 15(6), 1973, P. 1239-1247.

DISCLOSURE OF THE INVENTION

It is an object of the present invention to solve the aforementioned problems of the prior art by providing a carbon fiber precursor polymer and precursor which allow the temperature for the flame retardant step to be essentially lowered in order to inhibit fusion or thermal decomposition between fibers, without using large amounts of an expensive or special purpose monomer.

BEST MODE FOR CARRYING OUT THE INVENTION

The carbon fiber precursor polymer of the invention must be composed of a polymer comprising 50 wt % or greater of an acrylonitrile component, and the isotactic triad proportion of the acrylonitrile structural chain composed of the acrylonitrile component must be 35 mole percent or greater based on the total triad proportion of the acrylonitrile structural chain composed of the acrylonitrile component.

By using this manner of carbon fiber precursor polymer, it is possible to accomplish flame retardant treatment at a lower temperature and shorter time compared to carbon fiber production using conventional atactic PAN-based polymers, and thus not only significantly reduce energy usage but also overcome quality problems such as strength reduction due to fusion between single fibers, and process flow problems such as filament breakage.

A carbon fiber precursor polymer according to the invention is a premolding polymer in the form of a mass or pellets after polymerization of a polymer containing 50 wt % or greater of the acrylonitrile component but before molding into the desired shape, and a carbon fiber precursor according to the invention refers to the state after polymerization of the polymer containing 50 wt % or greater of the acrylonitrile component, and after molding into the form of a filament through a spinning process such as wet spinning, dry-wet spinning or dry spinning. In other words, the latter refers to the state before flame retardant treatment and heat carbonization treatment.

The carbon fiber precursor polymer of the invention must be composed of a polymer comprising 50 wt % or greater of an acrylonitrile component, because if the acrylonitrile component is present at less than 50 wt %, an adequate effect for improvement of the flame retardant property will not be exhibited in comparison to using an atactic PAN-based copolymer, and it will therefore be difficult to achieve the object of the invention.

The carbon fiber precursor polymer may be a simple polymer of stereoregular isotactic PAN wherein the isotactic triad proportion is 35 mole percent or greater, or it may be a mixture of two or more different polymers copolymerizing 50 wt % or greater of isotactic PAN, or a copolymer obtained by copolymerization which produces 50 wt % or greater of isotactic PAN.

The carbon fiber precursor polymer of the invention preferably comprises a copolymer composed of an acrylonitrile component, acrylic acid-based compound component and acrylic acid ester-based compound component as the main copolymerizing components, preferably wherein the acrylonitrile component constitutes at least 80 wt % of the copolymer and the total weight percentage of the acrylic acid-based compound component and the acrylic acid ester-based compound component is greater than 0% and less than 20%.

Here, "main" means that the total of the aforementioned three components (acrylonitrile component, acrylic acid-based compound component and acrylic acid ester-based compound component) constitutes at least 80 wt % and more preferably at least 90 wt % of the total copolymer component.

The acrylonitrile component preferably constitutes at least 80 wt % of the copolymer, which allows the hexagonal plane layer of the carbon fiber precursor to form adequately for supply to the flame retardant step, and also results in adequate performance of the carbon fiber product. The acrylonitrile component content is preferably 90 wt % or greater.

The copolymer preferably has a total weight percentage of the acrylic acid-based compound component and the acrylic acid ester-based compound component of greater than 0% and less than 20%, a range which will likewise allow the hexagonal plane layer of the carbon fiber precursor to form adequately for supply to the flame retardant step, while also resulting in adequate performance of the carbon fiber product.

In the polymer of the invention, the proportion of the isotactic triad content (mm triad %) of the acrylonitrile structural chain composed of the acrylonitrile component, relating to the acrylonitrile-derived peak as estimated by $^{13}$C-NMR, must be at least 35 mole percent based on the total triad proportion of the acrylonitrile structural chain composed of the acrylonitrile component. If it is not within this range, the increased distance between adjacent cyano groups in the structural chain will impede formation of the hexagonal plane layer of the carbon fiber precursor when supplied to the flame retardant step, and the dynamic strength of the carbon fibers obtained as the final product will be insufficient. The isotactic triad content (mm triad %) is preferably at least 65 mole percent based on the total triad proportion of the acrylonitrile structural chain composed of the acrylonitrile component.

The isotactic triad content (mm triad %) is the proportion of three contiguous repeating units (a triple structural chain) in an addition polymerization type polymer wherein all of the adjacent monomer unit side chains are in the meso (m) configuration.

Other types of triads include heterotactic triads (mr) and syndiotactic triads (rr). Here, "r" indicates a racemic configuration.

In other words, the isotactic triad content is the proportion of mm among the mm, mr and rr triads.

If the triad content (mm %) is less than 35 mole percent, the PAN spatial configuration will not exhibit an adequate effect on the flame retardant property, resulting in substantially little distinction from atactic PAN.

According to the invention, other components may also be copolymerized, preferably at less than 50 wt %, so long as the effect of the invention is exhibited, and although any conventional publicly known copolymerizable unsaturated compounds may be used, there are preferred unsaturated carboxylic acids and/or unsaturated carboxylic acid esters, and especially acrylic acid, methacrylic acid, itaconic acid and/or their alkyl esters.

As alkyl esters there are particularly preferred esters having C1-6 alkyl groups, such as one or more groups selected from among methyl, ethyl, propyl, isopropyl, n-butyl, i-butyl, t-butyl and cyclohexyl.

As other copolymerizing components there are preferably used acrylonitrile components, polar vinyl compounds such as acrylic acid-based compounds, acrylic acid ester-based compounds, methacrylonitrile, vinyl acetate, acrylamide, maleic anhydride and N-vinylpyrrolidone, and aromatic vinyl compounds such as styrene, vinylpyridine and vinylimidazole. These copolymerizing components may be used alone or in combinations, and preferably one or more compounds are selected from the group consisting of polar vinyl monomers including acrylic acid, methacrylic acid, itaconic acid and their alkyl esters, methacrylonitrile, vinyl acetate, acrylamide, maleic anhydride and N-vinylpyrrolidone, and aromatic vinyl compounds such as styrene, vinylpyridine and vinylimidazole, among which acrylonitrile components, acrylic acid-based compounds and acrylic acid ester-based compounds are particularly preferred for use.

Copolymerization of these components yields a random copolymer with acrylonitrile in a random arrangement, or a block copolymer forming blocks of acrylonitrile chains and other copolymerizing component chains.

Another role of the other copolymerizing components is to inhibit self-heating which occurs with intramolecular cyclization during the flame retardant treatment in order to attenuate thermal damage to the carbon fiber precursor, but excessive copolymerization of another copolymerizing component for this purpose can sometimes lead to reduced performance of the carbon fibers, and therefore when another copolymerizing component is used it is preferably present at less than 20 mole percent of the carbon fiber precursor polymer.

The process for production of a carbon fiber precursor polymer according to the invention is not particularly restricted so long as it is a process allowing production of isotactic PAN, and examples of effective processes include the solid-phase photopolymerization at low temperature (−78° C.) using a urea/monomer clathrate complex as reported by D. M. White et al. in J. Am. Chem. Soc., 1960, 82, 5671, an anionic polymerization process employing organic magnesium or the like as the reaction initiator (Y. Nakano et al., Polym. Int., 1994, 35(3), 249-55), or a radical polymerization process employing magnesium chloride or the like as a molecular template/carrier (H. Kuwahara et al., Polymer Preprints, 2002, 43(2), 978); most preferably, however, the unsaturated copolymerizing component composed mainly of an acrylonitrile component is absorbed onto a crystalline metal compound as the template compound to form a complex, which is subjected to solid-phase polymerization reaction for high molecularization.

The template compound used in this case is preferably a crystalline metal compound of Groups IIA to IIB of the Periodic Table, among which there may be mentioned halides, oxides, hydroxides, sulfides, nitrates, nitrites, sulfates, carbonates, thiosulfates, phosphates, aliphatic carboxylates and aromatic carboxylates, with halides being particularly preferred.

When the complex obtained by absorption onto the template compound as described above participates in the solid-phase polymerization reaction, the crystalline metal compound has an orderly and arranged structure of the metal cation and its pairing counter anion, and the acrylonitrile component and the unsaturated copolymerizing component can coordinate with the metal cation via unpaired electrons on the oxygen atoms or nitrogen atoms of the carboxyl groups, amide groups or carboxylic acid ester groups.

The arrangement of the acrylonitrile component and unsaturated copolymerizing component is determined by the order, sizes and interion distances of the metal cation and its counter anion. The arrangement will differ depending on the type of crystalline metal compound selected, but preferably a halide of a metal of Groups IIa to IIB of the Periodic Table is used as the template compound for isotactic stereocontrol.

As examples of such compounds there may be mentioned iron chloride, cobalt chloride, nickel chloride, manganese chloride, chromium chloride, anhydrous magnesium chloride, anhydrous calcium chloride, anhydrous lanthanum chloride, anhydrous yttrium chloride, iron bromide, cobalt bromide, nickel bromide, manganese bromide, chromium bromide, anhydrous magnesium bromide, anhydrous calcium bromide, anhydrous lanthanum bromide, anhydrous yttrium bromide, iron iodide, cobalt iodide, nickel iodide, manganese iodide, chromium iodide, anhydrous magnesium iodide, anhydrous calcium iodide, anhydrous lanthanum iodide, anhydrous yttrium iodide, and the like. Two or more of these may also be used in combination, or there may be used a complex salt such as alum or hydrotalcite having two or more metal cations present in a single crystal system.

The crystal system of the metal compound is most preferably a hexagonal system and/or trigonal system. Most metal compounds of hexagonal and trigonal systems adopt a layered structure on the macroscopic scale, and acrylonitrile components or unsaturated copolymerizing components become enclosed between the crystalline metal compound layers with the polar groups oriented in the same direction to produce a regularly ordered arrangement. Such hexagonal and/or trigonal metal compounds include calcium bromide hexahydrate, calcium iodide, calcium iodide hexahydrate, cobalt (II) chloride, cobalt (II) bromide, cobalt (II) iodide, cobalt (II) iodide hexahydrate, cesium nitrate, cadmium chloride, cadmium bromide, cadmium iodide, iron (II) chloride, iron (III) chloride, iron (II) bromide, iron (III) bromide, iron (II) iodide, potassium disulfide, potassium nitrite dihydrate, lithium iodide trihydrate, magnesium chloride, magnesium bromide hexahydrate, magnesium hydroxide, manganese (II) chloride, manganese (II) bromide, sodium nitrite, nickel (II) chloride, tin sulfate dihydrate, titanium (II) chloride, titanium (III) chloride, vanadium (II) chloride, vanadium (II) bromide, vanadium (III) bromide and zinc chloride, among which iron (III) chloride, cobalt (II) chloride and magnesium chloride are preferred, and magnesium chloride is particularly preferred.

The acrylonitrile component and unsaturated copolymerizing component (hereinafter both of these will be collectively referred to as "monomer component") are contacted with the template compound to form a complex, and this step is preferably carried out in an inert gas atmosphere of nitrogen or argon because if an oxygen-containing mixed gas such as air is used the radical growth ends may become inactivated, rendering it difficult to finally obtain a carbon fiber precursor polymer with a sufficient degree of polymerization.

The molar ratio of the monomer component and the crystalline metal compound of Groups IIA to IIB of the Periodic Table (A/M) is preferably at least 0.1 and less than 5.0, as this range gives the optimal amount of monomer component to coordinate with the template compound in order to obtain a high molecular compound, and allows the stereoregularity of the obtained carbon fiber precursor copolymer to be further increased since there is no adverse effect due to excess monomer component.

The particle size of the crystalline metal compound is also important, and the particle size of the metal compound is preferably at least 1 μm and less than 100 mm, and more preferably at least 5 mm and less than 50 mm, in order to obtain a carbon fiber precursor polymer having a viscosity-average molecular weight (hereinafter abbreviated as "Mv") of 50,000 or greater for an adequate spinning property.

If fine particles with a metal compound particle size of 1 μm or smaller is used, the Mv of the obtained carbon fiber precursor polymer will be below 50,000 and spinning will thus be extremely hampered. On the other hand, the particle size is preferably not 100 mm or greater because the monomer component may infiltrate into the interior of the metal compound and lengthen the time to completion of complex formation, while the complex formation itself may occur in a non-uniform manner.

The latter case should be avoided above all as it can lead to variation in the Mv during the subsequent solid-phase polymerization reaction.

The complex formed in the manner described above is transferred to an appropriate vessel under an inert gas atmosphere prior to the solid-phase polymerization reaction.

Solid-phase polymerization reaction processes are largely of two types, one being thermal solid-phase polymerization employing a reaction initiator capable of generating radicals by thermal decomposition, and the other being electromagnetic solid-phase polymerization utilizing irradiation of radical generating electromagnetic waves.

Thermal solid-phase polymerization includes a method wherein the reaction initiator is dissolved in a small amount of an organic solvent prior to addition and a method wherein a prepared solution of the reaction initiators in the monomer component is added to the crystalline metal compound, with the latter method being considered the preferred mode from the standpoint of uniform distribution of the reaction initiator. The addition may be accomplished by either a method of spontaneous absorption of the complex in a stationary state or a method of applying an appropriate degree of agitation to the complex, provided that the stirring is not so vigorous as to break up the complex.

The reaction initiator of the invention may be any one of ordinarily used as a reaction initiator for radical polymerization, and there may be suitably used transition metal compounds capable of single-electron release to promote radical polymerization, including azo compounds represented by azobisisobutyronitrile, 2,2'-azobis(2,4-dimethylvaleronitrile), 2,2'-azobis(4-methoxy-2,4-dimethylvaleronitrile), dimethyl-2,2-azobis(2-methylpropionate), 1,1-(cyclohexane-1-carbonitrile), 2,2-azobis(2-methylbutyronitrile) and 2,2-azobis[N-(2-propenyl)-2-methylpropionamide], organic peroxides represented by benzoyl peroxide, oxidation-reduction reaction initiators represented by potassium peroxysulfate/sodium nitrite or N,N'-dimethylaniline/benzoyl peroxide combinations, and manganese (III) acetylacetonate, cobalt (II) acetylacetonate, pentacyanobenzyl cobaltate and iron (II) sulfate/hydrogen peroxide (Fenton's reagent).

On the other hand, electromagnetic solid-phase polymerization has the advantage of requiring no addition of a reaction initiator since radicals are generated by irradiation of electromagnetic waves. The electromagnetic waves used may be any of sufficient energy to generate radicals in the monomer molecules, and there may be mentioned ultraviolet rays, X-rays, γ-rays, monochromatic visible light rays, natural sun rays, electron beams and the like.

The suitable temperature conditions for the solid-phase polymerization reaction are −80° C. to 150° C. A temperature of below −80° C. may not only drastically reduce the polymerization reaction rate, but will also increase the energy consumption required for cooling. A temperature of above 150° C. may result in gaseous dissociation of the monomer from the crystalline metal compound, making it impossible to obtain a carbon fiber precursor polymer with a satisfactory Mv.

The complex produced by the solid-phase polymerization reaction is composed of the crystalline metal compound and the carbon fiber precursor monomer. The final carbon fiber precursor polymer can therefore be obtained as the residue from elution of the metal compound with water, methanol, ethanol or the like.

The composition of the obtained polymer and the tacticity of the polyacrylonitrile main chain may be quantified by $^1$H-NMR and $^{13}$C-NMR.

The carbon fiber precursor polymer of the invention obtained by the production process described above may be spun by a conventional publicly known technique. The specific spinning method is not particularly restricted and may be ordinary wet spinning, dry spinning or dry-wet spinning. According to the invention, the carbon fiber precursor polymer filament obtained up to this point is referred to as the carbon fiber precursor. Incidentally, flame retardation of the isotactic-rich PAN units sometimes proceeds partially due to heat treatment for stretching and the like during the spinning step, and these modified structures are also encompassed within the scope of the carbon fiber precursor of the invention.

The carbon fiber precursor of the invention is converted to carbon fibers by heating flame retardant treatment at a temperature of 150-300° C., heating carbonization treatment at 300-2000° C. in an inert gas atmosphere, and graphite growth at 2000-2500° C. The atmosphere for the flame retardant treatment may be an inert gas atmosphere such as nitrogen, but an active gas atmosphere such as air is preferred from the standpoint of shortening the flame retardant treatment time. A low carbonization temperature of below 300° C. may result in the problem of reduced elasticity of the obtained carbon fibers. The carbon fibers may optionally be further subjected to surface treatment or oil coating or sizing treatment, as necessary.

The reason for the more rapid and lower temperature flame retardant treatment of the carbon fiber precursor polymer and carbon fiber precursor of the invention is believed to be as follows.

Specifically, as explained above, the flame retardant reaction occurs with intramolecular cyclization of adjacent nitrile groups in the structural chain, and therefore an isotactic structure wherein the nitrile groups are in a meso configuration is advantageous from a positional standpoint for cyclization of the adjacent nitrile groups, so that the reaction proceeds with a lower activation energy. Consequently, the flame retardant treatment can be carried out at a lower temperature with an isotactic structure.

In addition, since the carbon fiber precursor has a 3/1 helical structure induced by its isotacticity, it forms straight-chain fused pyridine rings, or a polynaphthylidine skeleton, during the flame retardant step.

Thus, the size of the hexagonal plane layer which grows at the stage of carbonization or graphitization is larger than achieved using a conventional carbon fiber precursor with an atactic structure, and the strength of the obtained carbon fibers is therefore increased.

EXAMPLES

The present invention will now be explained in greater detail through reference examples and examples, with the understanding that the invention is in no way restricted thereby.

The monomer conversion rate during polymerization and the compositions of the obtained polymers were determined by $^1$H-NMR, and the stereoregularity (tacticity) of the polymers was quantified by $^{13}$C-NMR (270 MHz, DMSO-d6 solvent JNR-EX-270 by Nihon Denshi Datum Co., Ltd.), to determine the isotactic triad content (mm %), syndiotactic triad content (rr %) and heterotactic triad content (mr %).

Example 1

A 50 g portion of hexagonal anhydrous magnesium chloride having a particle size of 10-30 mm was loaded as the template compound into a three-necked flask under a dry nitrogen stream, and kept in an ice bath at below 10° C.

A separately prepared three-necked flask was substituted with nitrogen, and then 34.6 ml of acrylonitrile, 2.0 ml of methyl acrylate, 1.2 ml of dibutyl itaconate and 0.25 g of azobisisobutyronitrile were combined therein as the monomer solution.

The mixture was then added to the three-necked flask containing the anhydrous magnesium chloride, and allowed to thoroughly absorb to prepare an A/M=1/1 complex.

Next, the three-necked flask was set in a hot-air circulating drier for 12 hours of solid-phase polymerization at 70° C. After the solid-phase polymerization, the complex was poured into methanol and the anhydrous magnesium chloride was removed by solvent extraction to yield an insoluble carbon fiber precursor copolymer in methanol, which was then filtered out and collected, washed with ion-exchanged water and acetone in that order, and then dried under reduced pressure overnight at 40° C.

The obtained carbon fiber precursor copolymer yield was 18.2 g (65.4%).

The copolymer composition was estimated by $^1$H-NMR measurement, indicating contents of 94.5%, 2.4% and 3.1% for the acrylonitrile component, methyl acrylate component and dibutyl itaconate component, respectively.

$^{13}$C-NMR measurement was carried out to determine the tacticity, confirming a high degree of isotacticity with mm/mr/rr=68.3/21.3/10.4.

The intrinsic viscosity [η] measured in N,N'-dimethylformamide at 35° C. was 2.04.

Example 2

A 50 g portion of hexagonal anhydrous magnesium chloride having a particle size of 10-30 mm was loaded as the template compound into a three-necked flask under a dry nitrogen stream, and kept in an ice bath at below 10° C.

A separately prepared three-necked flask was substituted with nitrogen, and then 34.6 ml of acrylonitrile, 2.0 ml of methyl acrylate and 1.2 ml of dibutyl itaconate were combined therein as the monomer solution. The mixture was then added to the three-necked flask containing the anhydrous magnesium chloride, and allowed to thoroughly absorb to prepare an A/M=1/1 complex.

Next, the three-necked flask and a 300 ml screw-necked glass bottle were placed in a nitrogen-substituted globe box and the complex was transferred from the three-necked flask to the screw-neck glass bottle. The screw-neck glass bottle containing the complex was set in a γ-ray irradiating apparatus with a $^{60}$Co ray source, for electromagnetic solid-phase polymerization at a dose of 10 KGy. The obtained carbon fiber precursor copolymer yield was 16.6 g (59.5%).

The copolymer composition was estimated by $^1$H-NMR measurement, indicating contents of 94.5%, 2.6% and 2.9% for the acrylonitrile component, methyl acrylate component and dibutyl itaconate component, respectively. $^{13}$C-NMR measurement was carried out to determine the tacticity, confirming a high degree of isotacticity with mm/mr/rr=68.1/21.5/10.4, The intrinsic viscosity [η] measured in N,N'-dimethylformamide at 35° C. was 2.96.

Example 3

The same procedure was carried out as in Example 1, except that hexagonal anhydrous cobalt chloride was used instead of anhydrous magnesium chloride.

After completion of the solid-phase polymerization, the complex was poured into 5 wt % diluted hydrochloric acid and the anhydrous cobalt chloride was removed by extraction to yield an insoluble carbon fiber precursor copolymer in the diluted hydrochloric acid which was then filtered out and collected. It was subsequently washed with ion-exchanged water and acetone in that order and then dried under reduced pressure overnight at 40° C.

The obtained carbon precursor copolymer yield was 11.9 g (42.7%).

The copolymer composition was estimated by $^1$H-NMR measurement, indicating contents of 93.3%, 2.8% and 3.9% for the acrylonitrile component, methyl acrylate component and dibutyl itaconate component, respectively. $^{13}$C-NMR measurement was carried out to determine the tacticity, confirming a high degree of isotacticity with mm/mr/rr=85.1/13.1/1.8.

The intrinsic viscosity [η] measured in N,N'-dimethylformamide at 35° C. was 1.67.

Example 4

The same procedure was carried out as in Example 3, except that hexagonal anhydrous iron chloride was used instead of anhydrous cobalt chloride.

The obtained carbon precursor copolymer yield was 14.4 g (51.6%).

The copolymer composition was estimated by $^1$H-NMR measurement, indicating contents of 95.7%, 2.6% and 1.7% for the acrylonitrile component, methyl acrylate component and dibutyl itaconate component, respectively. $^{13}$C-NMR measurement was carried out to determine the tacticity, confirming a high degree of isotacticity with mm/mr/rr=81.3/13.9/4.8.

The intrinsic viscosity [η] measured in N,N'-dimethylformamide at 35° C. was 1.46.

Example 5

The same procedure was carried out as in Example 1, except that 42 g of orthorhombic hexagonal beryllium chloride was used instead of anhydrous magnesium chloride.

The obtained carbon precursor copolymer yield was 17.1 g (61.3%).

The copolymer composition was estimated by $^1$H-NMR measurement, indicating contents of 95.4%, 2.9% and 1.7% for the acrylonitrile component, methyl acrylate component and dibutyl itaconate component, respectively. $^{13}$C-NMR measurement was carried out to determine the tacticity, which was mm/mr/rr=38.0/38.2/23.8.

The intrinsic viscosity [η] measured in N,N'-dimethylformamide at 35° C. was 1.98.

Example 6

The same procedure was carried out as in Example 1, except that 50 g of anhydrous magnesium chloride, 103.8 ml of acrylonitrile, 6.0 ml of methyl acrylate, 3.6 ml of dibutyl itaconate and 0.75 g of azobisisobutyronitrile were combined, for A/M=3/1.

The obtained carbon precursor copolymer yield was 82.2 g (91.8%).

The copolymer composition was estimated by $^1$H-NMR measurement, indicating contents of 95.9%, 2.5% and 1.6% for the acrylonitrile component, methyl acrylate component and dibutyl itaconate component, respectively. $^{13}$C-NMR measurement was carried out to determine the tacticity, which was mm/mr/rr=38.2/38.0/23.8.

The intrinsic viscosity [η] measured in N,N'-dimethylformamide at 35° C. was 2.62.

Example 7

The same procedure was carried out as in Example 1, except that fine powdery magnesium chloride with a particle size of 1 μm or smaller was used.

The obtained carbon precursor copolymer yield was 25.6 g (91.8%).

The copolymer composition was estimated by $^1$H-NMR measurement, indicating contents of 95.5%, 2.7% and 1.8% for the acrylonitrile component, methyl acrylate component and dibutyl itaconate component, respectively. $^{13}$C-NMR measurement was carried out to determine the tacticity, which was mm/mr/rr=67.9/21.6/10.5.

The intrinsic viscosity [η] measured in N,N'-dimethylformamide at 35° C. was 1.95.

Example 8

The same procedure was carried out as in Example 1, except that acrylonitrile alone was used as the starting material, without methyl acrylate or dibutyl itaconate.

The obtained carbon precursor copolymer yield was 18.8 g (67.7%).

$^{13}$C-NMR measurement was carried out to determine the tacticity, which was mm/mr/rr=68.4/24.4/7.2.

The intrinsic viscosity [η] measured in N,N'-dimethylformamide at 35° C. was 1.81.

Comparative Example 1

Polymerization was conducted under the same conditions as in Example 1, except that no anhydrous magnesium chloride was added as a template compound.

The obtained carbon precursor copolymer yield was 21.9 g (78.5%).

The copolymer composition was estimated by $^1$H-NMR measurement, indicating contents of 95.3%, 2.9% and 1.8% for the acrylonitrile component, methyl acrylate component and dibutyl itaconate component, respectively.

$^{13}$C-NMR measurement was carried out to determine the triad tacticity, which was mm/mr/rr=27.0/50.4/22.6, confirming that a substantially atactic carbon fiber precursor copolymer had been obtained. The intrinsic viscosity [η] measured in N,N'-dimethylformamide at 35° C. using a Ubbelohde viscometer was 1.83.

The isotactic-rich carbon fiber precursor copolymers of the examples had top temperatures for the exothermic peak of cyclization reaction during the flame retardant treatment which were shifted toward the lower temperature end compared to the more atactic comparative example, with increased peak mesial magnitude and reduced heat generation.

These results suggest that an isotactic-rich carbon fiber precursor polymer according to the invention allows flame retardant treatment to be carried out in a lower temperature range, while the large mesial magnitude and low heat generation suggest more gentle progression of the flame retardant reaction.

A major effect is therefore exhibited by the carbon fiber precursor polymer and carbon fiber precursor with no fusion or thermal decomposition between carbon fibers and excellent flame retardant treatment characteristics.

The invention claimed is:

1. A process for production of a carbon fiber precursor polymer which yields a carbon fiber precursor polymer composed of a polymer comprising 50 wt % or greater of an acrylonitrile component, wherein the isotactic triad proportion of the acrylonitrile structural chain composed of the acrylonitrile component is 35 mole percent or greater based on the total triad proportion of the acrylonitrile structural chain composed of the acrylonitrile component, by using an unsaturated copolymerizing component composed mainly of acrylonitrile as a template compound, absorbing it into a crystalline metal compound to form a complex, wherein said crystalline metal compound is a hexagonal and/or trigonal metal compound and has a layer structure of at least one compound selected from the group consisting of cadmium iodide, cadmium chloride and cadmium sulfide, and subjecting the complex to solid-phase polymerization reaction for high molecularization.

* * * * *